July 15, 1941.    O. G. JOHNSON    2,249,211
AUTOMATIC SPRINKLER
Filed Dec. 30, 1938    2 Sheets-Sheet 1

Inventor:
Oscar G. Johnson
By Theodore W. Miller
Atty

July 15, 1941.   O. G. JOHNSON   2,249,211
AUTOMATIC SPRINKLER
Filed Dec. 30, 1938   2 Sheets-Sheet 2

Inventor:
Oscar G. Johnson
By: Theodore W. Miller
Att'y.

Patented July 15, 1941

2,249,211

UNITED STATES PATENT OFFICE 2,249,211

AUTOMATIC SPRINKLER

Oscar G. Johnson, Michigan City, Ind.

Application December 30, 1938, Serial No. 248,544

1 Claim. (Cl. 299—49)

This invention relates to automatic sprinklers in general and more particularly to automatic lawn sprinklers.

It is highly desirable in sprinkling grass or other vegetation to uniformly cover the same over an extended area with a minimum of care and attention and the primary object of this invention is accordingly to provide an apparatus to that end.

Another object of this invention is to provide a sprinkler apparatus which is automatically propelled over an extended area by the pressure and velocity of the supply water and which simultaneously and automatically distributes the water uniformly over said area.

A further object of this invention is to provide such an apparatus which is automatically guided over a predetermined area regardless of whether such area is regular or irregular in shape.

It is also an object of this invention to provide such an apparatus, the parts of which are simple and economical of manufacture and assembly and are accessible for inspection, renewal or repair, and which is convenient in operation.

Other objects of this invention will be more apparent as the same becomes better understood from an examination of the specification and claim in conjunction with the accompanying drawings wherein:

Figure 1:
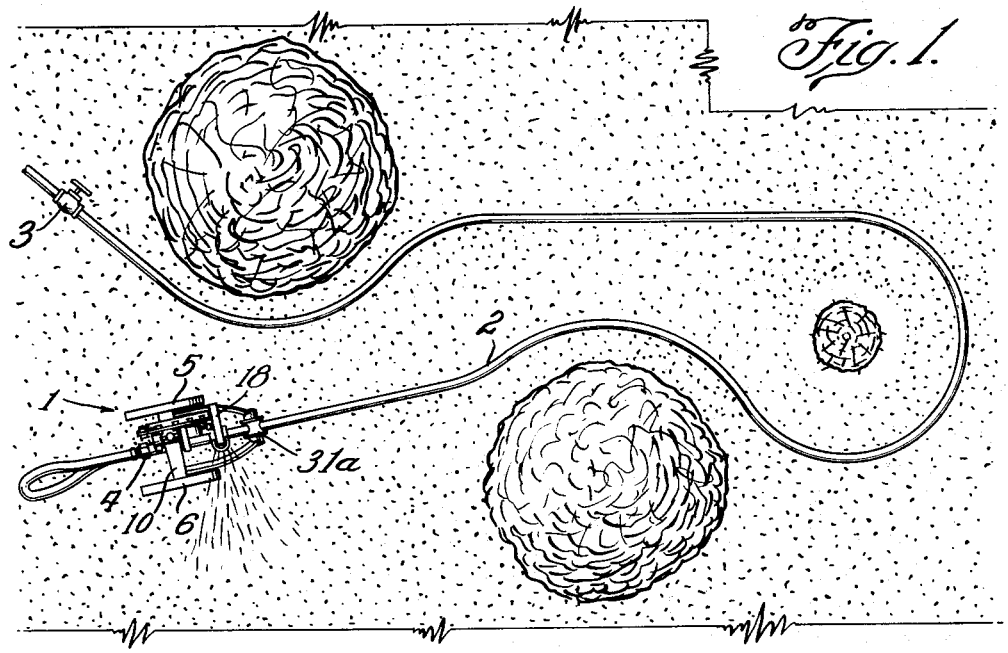
Fig. 1 is a plan view showing the apparatus in operation on a lawn.

Referring to the drawings more particularly, reference character 1 generally designates a sprinkler device connected to a garden hose 2 which is laid out along the course, regular or irregular, on the lawn having regard to the trees, bushes, hedges or flower beds thereon, that it is desired to have the device 1 travel.

One end of the hose 2 is connected to a source 3 of water supply under the usual pressure. The other end of the hose 2 is doubled back on its laid out part and attached, by means of an ordinary hose coupling or fitting 4, to the device 1.

Figure 2:
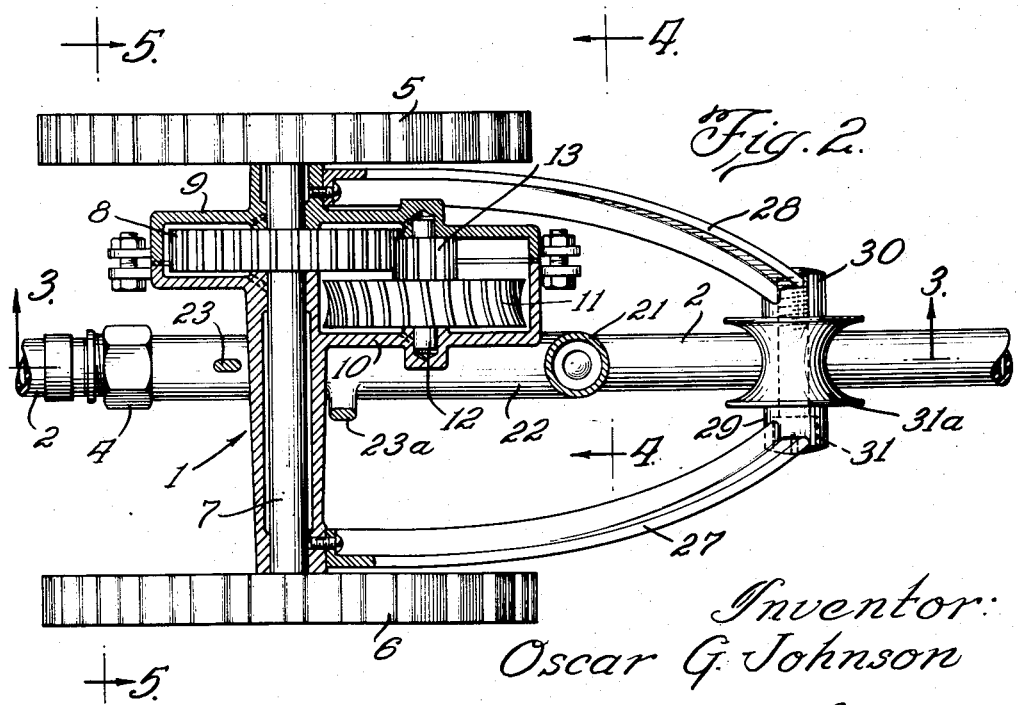
Fig. 2 is an enlarged horizontal fragmentary sectional view of the sprinkler device per se with parts omitted.

The device 1, as shown in Fig. 2, includes a pair of spaced wheels 5 and 6 which, together with a third wheel hereinafter described, act to movably support the device. The wheels 5 and 6 are mounted on an axle 7 for rotation therewith. A gear 8 is also mounted on the axle 7 for rotation therewith. A housing is provided in two cast metal sections, one section 9 being flanged and bolted to a second section 10, for enclosing the axle 7 and gear 8 and for also enclosing and supporting a worm gear 11 on a shaft 12 and a pinion 13 also on said shaft. The pinion 13 is in mesh with gear 8. The sections 9 and 10 of the housing are provided with opposed bosses and recesses therein forming bearings for the shaft 12. The sections 9 and 10 are each provided with an integral cooperating boss having a recess therein forming bearings for the shaft 12. The sections 9 and 10 are also each provided with integral cooperating extensions forming a housing for a worm gear 14 on a turbine shaft 15, the section 10 having an opening and bushing 16 therein forming a bearing for said shaft. The shaft 15 also has a bearing 17 spaced from the bushing 16 and formed by an integral extension on the housing casting section 10. The shaft 15 has a turbine wheel 18 mounted thereon exteriorly of the bearing 17. The casting 10 also is provided with an upward extension 19 which is drilled to form a bearing for a shaft 20 for supporting a nozzle 21 as hereinafter described.

The nozzle 21 is integrally formed with a right-angular pipe 22 threaded to receive the fitting 4 for connection to the hose 2. A pair of supporting arms 23 and 23a are suspended from the shaft 20 and are keyed thereto whereby the nozzle 21 may be moved to cause rotation of said shaft and the latter secured by means of a thumb nut 24 to hold the nozzle in any desired angular adjusted position toward or away from the base of the blades on the turbine wheel 18. When the nozzle 21 is adjusted to direct the stream of water directly at the base of the blades on the turbine wheel 18, more of the force of the water will be converted into power for propelling the wheels 5 and 6 whereas when the nozzle is adjusted to direct the stream of water toward the tip of the blades more of the water is carried laterally of the device and less force utilized in propulsion. A valve 25 and manually operable threaded stem 26 therefor is provided in the nozzle 21 to variably adjust the amount, force and character of the stream leaving the nozzle and incidently the area covered by the reacting stream from the device.

A pair of forwardly extending and inwardly curved angle irons 27 and 28 are bolted one to the housing section 10 and one to the housing section 9, respectively. The forward end of irons 27 and 28 are welded to cylindrical bosses 29 and 30, respectively. A shaft in the form of a stud 31 having its head sunk in the boss 29 extends transversely therefrom and is threaded into the boss 30 for rotatably supporting a flanged guidewheel 31a which acts as the third wheel of the device heretofore mentioned and travels along the laid out part of the hose 2 to guide said device therealong toward the source 3 of water supply.

The wheels 5 and 6 may be cast and in the form of lawn-mower wheels or they may take any suitable form and be provided with any suitable tread.

The nozzle 21 is provided with an arcuate outlet guide 32 to directionalize the water that reacts from the turbine wheel 18 in the form of a spray.

Figure 3:
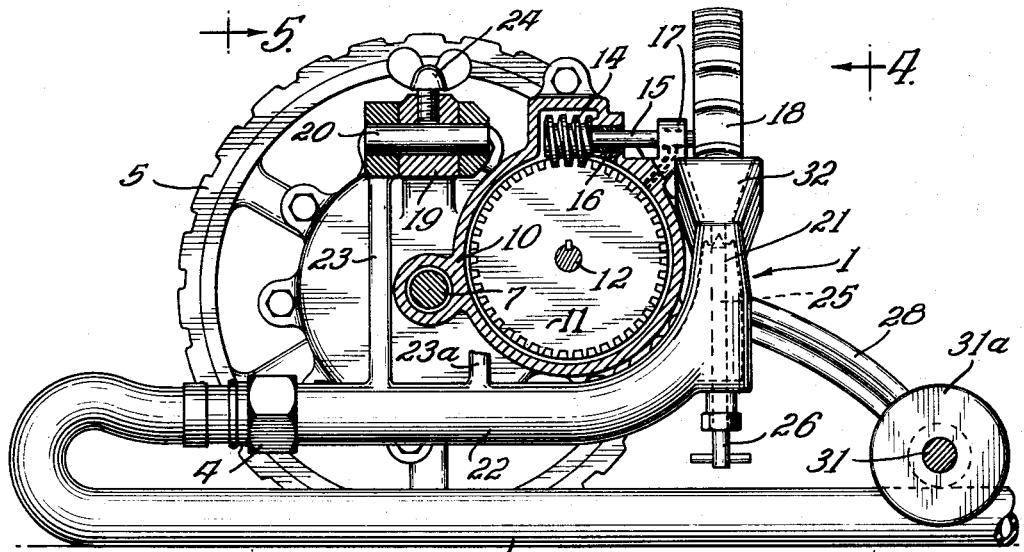
Fig. 3 is a longitudinal vertical sectional view taken at the line 3—3 of Fig. 2.
Figure 5:
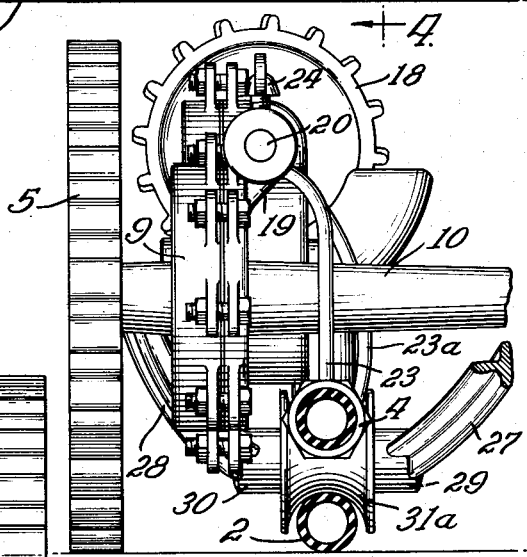
Fig. 5 is a transverse sectional view taken at the line 5—5 of Fig. 3.
Figure 4:
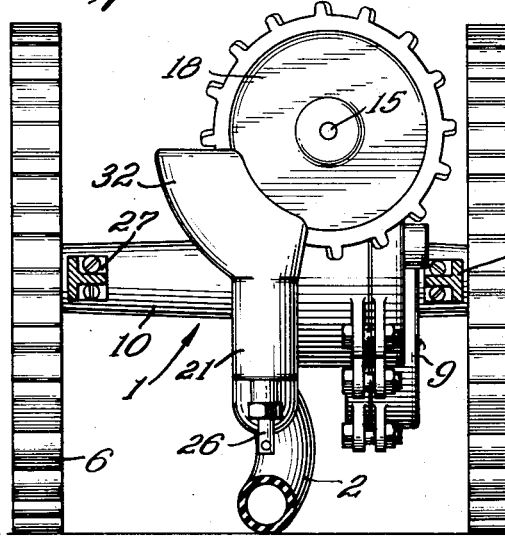
Fig. 4 is a transverse sectional view taken at the line 4—4 of Fig. 3.

The gear case formed by the sections 9 and 10 serves as an oil reservoir and feeds oil to shafts 7, 12 and 15 and bearings therefor, through suitable ports and passages such, for example, as indicated in dotted lines in Figs. 2 and 3.

The advantages and operation of the foregoing device and apparatus will be apparent without further detail.

I am aware that many changes may be made without departing from the principles of this invention and I therefore do not wish to be limited to the details shown or described.

I claim:

In an apparatus of the character described, the combination of a sprinkler vehicle having spray means and traction wheels automatically operable thereby, a hose connection for delivering water to said means, said connection being below and rearwardly of the center of said wheels and a guide wheel forwardly of the traction wheels having sheaves for following the course of a hose, the latter being doubled back and connected to said connection, thereby allowing the guide wheel freedom to follow the hose uninfluenced to any substantial extent by the pull of the hose on the vehicle.

OSCAR G. JOHNSON.